Patented Mar. 1, 1949

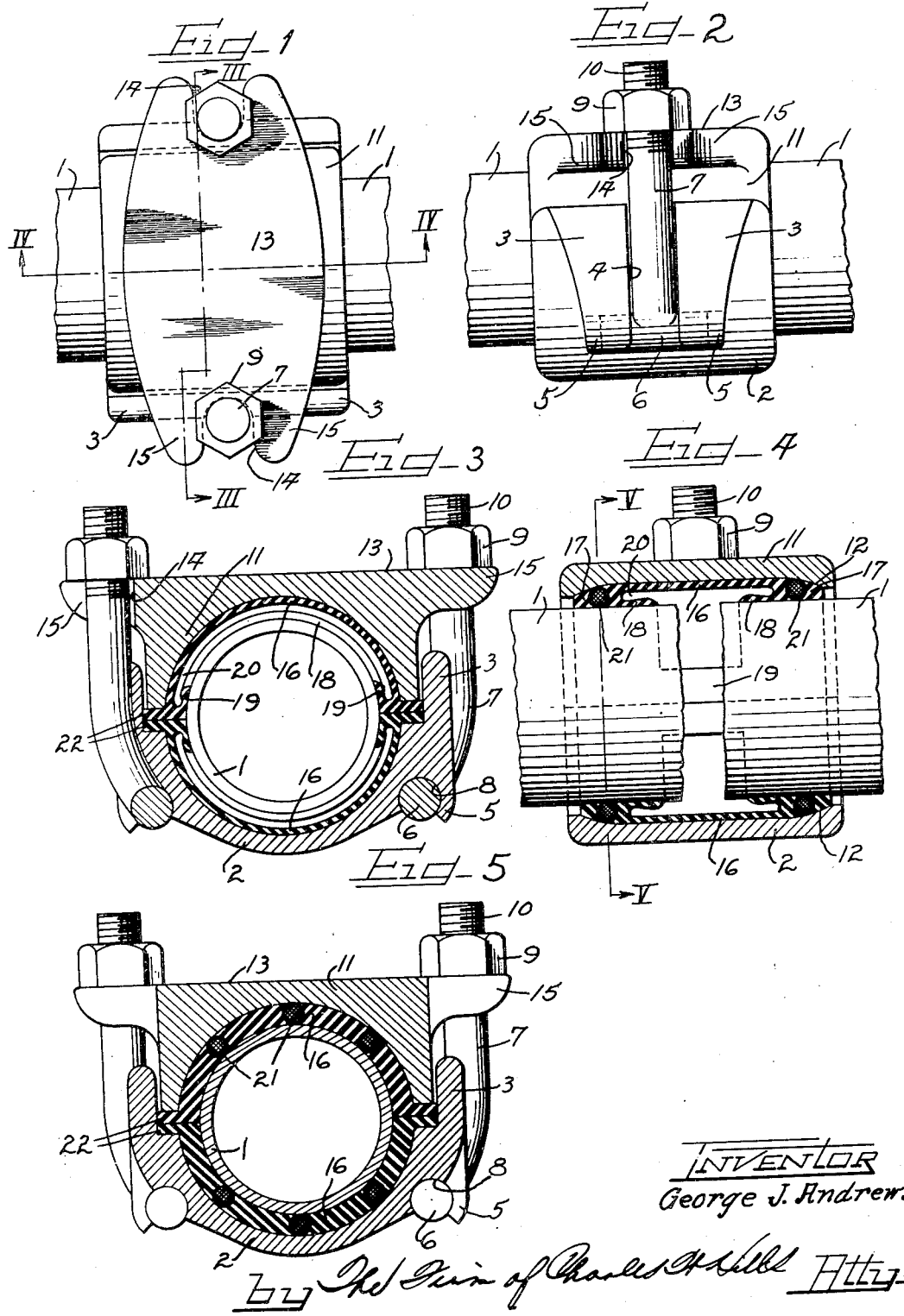

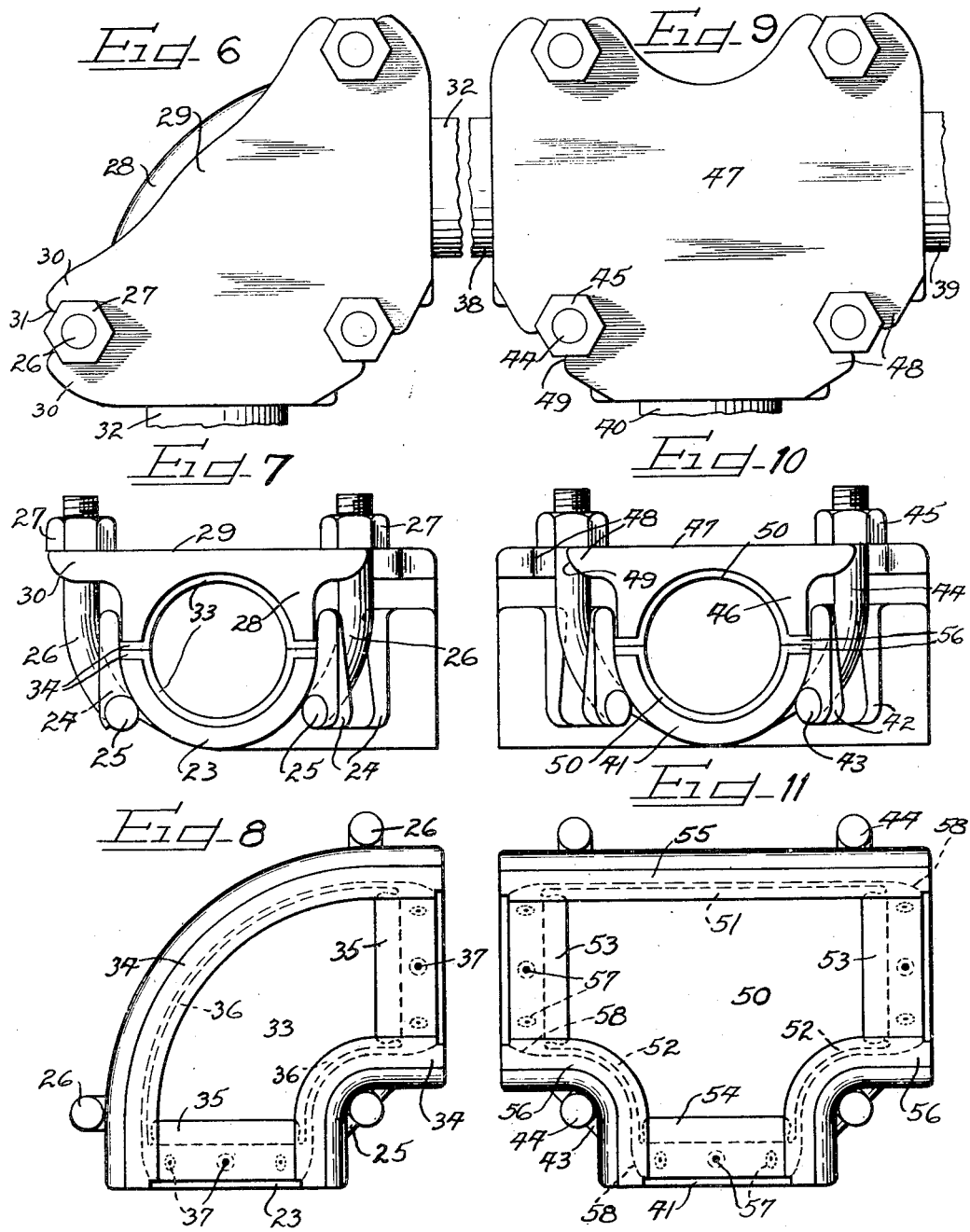

2,463,235

UNITED STATES PATENT OFFICE 2,463,235

FLEXIBLE PIPE-COUPLING

George J. Andrews, Chicago, Ill.

Application December 29, 1944, Serial No. 570,232

16 Claims. (Cl. 285—194)

The present invention relates to a coupling adapted for use in connecting metal hose sections, pipes or the like, and including an improved sectional housing enclosing a gripping type of flexible gasket to provide a coupling construction which will be highly efficient in its action, economical to produce, and easily applied and removed.

Among the features which characterize this invention is the arrangement of a metal sectional type of coupling housing which encloses a split or sectional chambered rubber gasket including circumferential and longitudinally disposed sealing means held closely pressed together around aligned pipe sections or the like to position a plurality of distributed gripping and wedging members, partially embedded in the gasket sections, in place to grip both the coupling housing and the pipes to hold the pipes securely and flexibly coupled free from direct metal-to-metal contact with the coupling housing.

It is an object of the invention to provide an improved flexible coupling, and is more specifically concerned with a flexible gasket means carrying embedded grippers for securing pipes against disconnection within a coupling housing without direct metal-to-metal contact of the pipes with the coupling housing.

It is also an object of the invention to provide a flexible pipe coupling of the straight, elbow or T type and including a seal type of flexible sectional gasket recessed to hold roughened grippers for wedge locking pipes within the coupling housing and obviating any direct metal-to-metal contact between the pipes and the metal sections forming the coupling housing.

It is a further object of the invention to provide a flexible pipe coupling which may be cheaply manufactured and readily applied and removed, and which will afford effective circumferential and longitudinal pressure seals between the enclosed pipe ends and the sectional coupling housing.

It is furthermore an object of the invention to provide a flexible pipe coupling having a pressure seal sectional flexible gasket including grippers permitting a wedge seal to be effected between the pipes and the coupling housing and also permitting relative angular movement of the pipes with respect to one another and with respect to the coupling housing.

Another object of the invention is to provide an improved type of quick attachable and detachable metal hose or pipe coupling including grippers embedded in a flexible sealing gasket and producing a combination gripping and wedging action between the coupling housing and the members being coupled.

Still another object of the invention is to provide a flexible coupling wherein flexible sealing gasket sections are provided with embedded gripping means for wedgingly engaging pipes in a sectional housing including pivoted bolt means for quickly mounting and removing the coupling.

It is a further object of the invention to provide a flexible coupling adapted to be made in various forms for holding pipes and the like coupled in alignment or at an angle with respect to one another, said coupling including a flexible sectional gasket affording circumferential as well as longitudinal pressure seals around the adjacent ends of the pipe or members being coupled.

Although the present invention is described in connection with the coupling of pipes or metal hose, it is apparent to one skilled in the art that the invention may with equal facility be used for the flexible coupling and sealing of other members or devices to wedgingly hold the same in operative position.

Other objects and features of the invention will be more fully apparent from the disclosures in the specification and the accompanying drawings, which illustrate preferred embodiments thereof.

In the drawings:

Figure 1 is a top plan view of a quick attachable and detachable type of flexible pipe coupling of the straight type embodying the principles of this invention and engaged over the adjacent ends of two aligned pipes to couple the same;

Figure 2 is a side elevational view of the flexible pipe coupling shown in Figure 1;

Figure 3 is a transverse sectional view taken on line III—III of Figure 1;

Figure 4 is a longitudinal sectional view of the coupling taken on line IV—IV of Figure 1 showing the pipes in elevation with the adjacent ends partly broken away;

Figure 5 is a transverse detail sectional view, partly in elevation, taken on line V—V of Figure 4;

Figure 6 is a top plan view of a modified form of coupling of the elbow type also embodying the principles of this invention and designed for coupling pipes at an angle with respect to one another;

Figure 7 is a side elevational view of the elbow type flexible pipe coupling shown in Figure 6;

Figure 8 is a top plan view of the lower half of the elbow type pipe coupling of Figures 6 and 7, with the pipes omitted to more clearly illustrate the construction of one of the half elbow sections of the coupling gasket;

Figure 9 is a top plan view of another modified form of flexible pipe coupling of the T or three way type for coupling an intermediate pipe at right angles to a pair of aligned pipes;

Figure 10 is a front elevational view of the T type flexible pipe coupling shown in Figure 9; and Figure 11 is a top plan view of the lower half of the T type coupling, with the pipes omitted, to illustrate the construction of one of the flexible gasket sections.

As shown on the drawings:

The present invention relates to flexible pipe couplings for coupling two or more pipes, metal hose sections, or the like, in alignment or at angles with respect to one another, and obviating metal-to-metal contact between the pipes and the metal coupling housing through the medium of a flexible sectional gasket unit comprising recessed pressure pipe sealing sections carrying embedded combination gripping and wedging members for sealingly holding the pipes engaged within the coupling to provide a leak-proof seal permitting slight angular movement of the pipes with respect to one another and with respect to the coupling housing without impairing the wedge-like sealing joint produced by the improved sectional gasket of the coupling unit.

Referring to Figures 1 to 5 inclusive, a straight type of flexible pipe coupling is illustrated for holding the spaced ends of adjacent metal pipes 1 securely coupled in substantial alignment with one another. The flexible pipe coupling comprises an outer metal sectional housing unit for enclosing a flexible inner sectional gasket unit which serves as a separating means between the metal sectional housing and the adjacent ends of the pipes 1 engaged therein.

The metal housing unit comprises a lower or base clamping section 2 of substantially semi-tubular form formed with oppositely positioned pairs of spaced bearing fingers or arms 3 having portions thereof extending upwardly above the top of the lower or base clamping section. The two arms 3 of each pair are spaced apart as illustrated in Figure 2 to provide a bolt receiving groove 4. The lower ends of the arms 3 are provided with bearing fingers 5 which normally are straight to permit the cylindrical head 6 of a T bolt 7 to be pivotally engaged in a bearing recess or socket 8, one of which is provided on each side of the lower portion of the coupling base section 2 as clearly illustrated in Figures 3 and 5. After the heads 6 of the clamping bolts 7 are seated in the sockets 8, the bearing fingers 5 are deflected or bent inwardly around the bolt heads 6 to hold the T bolts pivotally supported in position. The shanks or stems of the T bolts 7 have the ends adjacent to the heads curved to permit the bolts when in locking position to seat in the grooves 4 and conform to the curvature of the exterior of the housing base section 2 as shown in Figure 3. The curved construction of the bolts provides an arrangement whereby the clamping force at the pivoted ends of the bolts is applied closer to the center of the clamping housing to permit more clamping pressure to be applied to the contacting positions of the housing sections. Each of the pivotally mounted T bolts 7 is provided with a clamping nut 9 which is threadedly engaged on the threaded end 10 of a bolt 7. The construction of the sectional coupling housing is such that the nuts 9 of the bolts 7 only require loosening to a certain degree to permit the bolts to swing downwardly into open position or upwardly into locking position without requiring complete removal of the nuts from the bolts.

The coupling housing unit also includes an upper or top clamping section 11 of substantially semi-tubular form having a semi-cylindrical recess therein corresponding with a similar semi-cylindrical opening in the base section 2. The semi-cylindrical openings in each of the coupling housing sections 2 and 11 have the ends thereof gradually tapered to provide a tapered or concave wedging surface at 12 as clearly illustrated in Figure 4. It will thus be noted that when the two coupling sections 2 and 11 are interengaged and bolted together by means of the pivot bolts 7 and the nuts 9 as illustrated in Figures 3 and 5, that a substantially cylindrical coupling chamber is provided within said housing having the ends thereof gradually tapered and reduced in diameter as shown in Figure 4 for a purpose hereinafter more fully described. The top of the upper clamping section 11 is provided with an integral flat oval top plate 13 as shown in Figure 1, and has the ends thereof projecting beyond the sides of the body portion of the coupling housing. Each end of the top plate 13 of the upper coupling section is provided with a bolt receiving recess 14 between a pair of ears or lugs 15 for the reception of the threaded ends of the clamping bolts 7. The ears 15 formed at the ends of the top plate 13 of the upper housing section 11 also serve as supports or stops against which the nuts 9 are adapted to be forcibly engaged when threaded downwardly on the bolts 7 to securely hold the housing sections tightly clamped around the flexible sectional gasket unit on the adjacent ends of the pipes 1 engaged therein.

The flexible gasket unit is of sectional construction and comprises two semi-cylindrical flexible gasket sections 16 constructed of rubber or other suitable flexible material. The two gasket sections are identical in construction and are shaped to permit one of the gasket sections to seat in the lower or base housing section 2 while the other gasket section is adapted to be seated in the upper or top housing section 11. Each of the flexible semi-cylindrical gasket sections 16 has the outer portion of each end thereof gradually reduced in diameter or tapered at 17 as shown in Figure 4, while the inner surface of each gasket section is of straight semi-cylindrical shape to fit around the outer surfaces of the adjacent ends of the pipes 1 to be coupled. Each of the flexible gasket sections 16 is formed on the interior thereof with two opposite inwardly projecting semi-circular pressure flanges 18. The flexible pressure flanges 18 are integrally connected at each side of the gasket section by a longitudinally disposed pressure flange 19. The pressure flanges 18 and 19 form a continuous pressure flange or frame flange within each of the flexible gasket sections 16 to seat upon the outer surfaces of the adjacent ends of the pipes being coupled as shown in Figures 3 and 4. The pressure flanges 18 and 19 in each of the gasket sections provide a pressure recess or chamber 20 to permit liquids or gases passing through the pipes to pass into said chambers 20 in back of the flanges 18 and 19 to exert pressure thereon to tightly press the same into leak-proof sealing engagement with the outer surfaces of the pipes 1.

For the purpose of securely locking and wedgingly holding the ends of the pipes engaged within the coupling housing and within the chambered flexible pressure gasket, each of said flexible gasket sections 16 at each of the tapered ends thereof and to the outside of the flange 18, has recessed or molded therein a plurality of spaced exteriorly roughened or knurled gripping and wedging balls 21 which are positioned in spaced circular relationship as shown in Figure 5 and project through openings in the inner surfaces and outer surfaces of the flexible gasket sections to permit the gripping balls to grip the exterior surfaces of the pipes 1 and the inner surfaces of the coupling housing sections 2 and 11. While knurled gripping and wedging balls 21 are illustrated and described, it is to be understood that the knurled gripping members may be of a different shape if required for certain types of coupling constructions.

To furthermore insure a tight sealing fit between the gasket sections 16 around the adjacent ends of the pipes 1, each of the gasket sections 16 is provided with radially projecting outer sealing flanges 22. As clearly illustrated in Figures 3 and 5, the gasket section flanges 22 seat against one another longitudinally of the coupling joint and also seat against shoulders formed on the respective lower and upper coupling housing sections 2 and 11 to permit the flexible gasket flanges 22 to be tightly clamped together by means of the bolts 7 and the nuts 9, thereby causing the knurled gripping balls 21 to clamp against the other surfaces of the pipes 1 and against the inner tapered surfaces 12 of the housing sections 2 and 11 as illustrated in Figure 4.

From the foregoing it will be apparent that the improved straight type of pipe coupling provides a quick attachable and detachable coupling construction including an improved form of flexible sectional gasket provided with both circumferential and longitudinally disposed pressure flanges on the interior of the gasket and with exterior sealing flanges, the latter being sealingly pressed together by the housing sections of the coupling. Liquid or gases under pressure passing from one pipe into another through the flexible pipe coupling is permitted to have a portion thereof pass through the space between the adjacent ends of the coupled pipes into the pressure chambers 20 provided in the flexible sectional gasket so that pressure is exerted upon the inner surfaces of the sealing flanges 18 and 19 to securely press said flanges into sealing engagement with the pipes 1 thereby augmenting the seal afforded by the exterior gasket flanges 22. The pressure exerted by the liquid or gases passing through the pipes in addition to pressing the sealing flanges 18 and 19 against the pipes also exert pressure against the inner grooves formed by the flanges 18 and 19. The pressure produced in the grooves formed by the gasket flanges 18 acts outwardly toward the ends of the gaskets thereby producing pressure against the knurled gripping balls 21 to wedgingly force the same outwardly against the wedge or tapered surfaces 12 of the coupling housing sections 2 and 11 to securely and tightly seal the ends of the flexible gasket between the pipes and the coupling housing. It will be noted that any tendency of the pipes 1 to move outwardly away from one another within the flexible coupling will also cause the gripping balls 21 to more tightly wedge between the pipes and the coupling housing to increase the efficiency of the flexible seal.

It will be noted that the sectional flexible gasket within the coupling housing not only provides a highly efficient leak-proof seal and connection between the adjacent ends of the pipes 1 but also provides a wedge lock acting against the separation of the pipes 1 within the coupling housing. The flexible sectional gasket is so constructed and positioned that there is no metal-to-metal contact between the pipes 1 and the metal coupling housing sections 2 and 11. A further advantage of the flexible sectional gasket produces a flexible coupling seal permitting the respective pipes 1 to be slightly moved angularly with respect to one another and with respect to the coupling housing.

While Figures 1 to 5 inclusive illustrate a straight type of pipe coupling, it is to be understood that the coupling may be formed for the purpose of coupling pipes and the like at different angles with respect to one another by couplings of the elbow or T types.

Figures 6, 7 and 8 illustrate a modified form of flexible pipe coupling of the elbow type which embodies all the improved features and advantages described in connection with the straight type of flexible pipe coupling set forth in connection with the coupling illustrated in Figures 1 to 5 inclusive. The elbow type of flexible pipe coupling comprises a metal sectional housing consisting of a lower or base semi-tubularly shaped elbow clamping section 23 formed with three pairs of spaced bearing arms 24 shaped to provide pivotal bearings for the T or cross heads 25 of clamping bolts 26, each of which is provided with a threaded end section for the reception of a clamping nut 27. The elbow housing also includes an upper or top elbow clamping section 28 which is also of semi-tubular shape to co-operate with the lower elbow section 23 to provide the necessary metal clamping housing for the gasket unit of the coupling. The top elbow clamping section 28 has integrally formed thereon a triangularly shaped top plate 29 formed with three pairs of spaced ears or lugs 30 forming bolt receiving recesses 31 to receive the upper ends of the pivoted clamping bolts 26 to permit the housing sections to be rigidly clamped together by means of the nuts 27 for the purpose of rigidly and sealingly holding a pair of pipes 32 coupled at substantially right angles to one another for a right angle elbow, or at different angles depending upon the shape of the elbow coupling.

The elbow shaped coupling housing encloses a flexible sectional elbow shaped gasket constructed of rubber or other suitable flexible material. The elbow gasket comprises semi-tubularly shaped elbow gasket sections 33, each formed with outer curved clamping flanges 34 adapted to be engaged by curved shoulders formed on the housing sections 23 and 28 to sealingly clamp the gasket sections around the pipes 32 between the housing sections by means of the bolts 26 and nuts 27 as illustrated in Figure 7. Each of the elbow gasket sections 33 is provided with semi-circular pressure flanges 35 and with curved or elbow shaped pressure flanges 36. The pressure flanges 35 and 36 of each of the elbow gasket sections form a continuous inwardly directed flange-like frame forming a chamber or recess in each of the elbow gasket sections thereby providing a connecting pressure chamber with the elbow coupling between the angularly positioned pipes 32 so that the liquid or gases passing from one pipe into another pass into the gasket chambers of the elbow coupling and exert pressure against the backs of the flanges 35 and 36 to sealingly press the same into tight engagement with the outer surfaces of the pipes 32 to form a tight flexible coupling seal. Each of the flexible elbow gasket sections 33 has embedded in circular spaced relationship in each of the ends thereof a plurality of spaced knurled gripping or wedging balls 37 which project from the gasket sections into gripping engagement with the outer surfaces of the pipes 32 and into gripping engagement with the inner surfaces of the coupling housing sections 23 and 28. The gripping balls 37 engage against tapered surfaces formed in the ends of the housing sections so that the pressure exerted within the flexible gasket acts to cause the knurled gripping balls 37 to move outwardly into wedging engagement with the tapered surfaces of the housing sections thereby also wedgingly locking the pipes 32 against being pulled out of the ends of the elbow coupling. It will thus be noted that a pressure seal and a wedge lock is provided by the sectional flexible elbow gasket between the pipes 32 and the sectional coupler housing in the elbow type coupler, which by means of the clamping T bolts pivoted on one of the housing sections and engaging in the other housing section affords a quick attachable and detachable elbow coupler for coupling pipes at an angle with respect to one another and permitting a slight movement of the pipes with respect to the coupler through the medium of the intermediate flexible gasket.

Figures 9 to 11 illustrate another modified form of flexible pipe coupling of T construction permitting three pipes 38, 39 and 40 to be coupled, with the pipe 40 positioned at substantially right angles to the pipes 38 and 39. The T type of flexible pipe coupling embodies the features, characteristics and advantages set forth in connection with the straight type of flexible pipe coupling and the elbow type coupling hereinbefore described. The T coupling is of three-way construction and comprises a metal T shaped base clamping section 41 provided with four sets of base arms 42 formed to provide bearing sockets for the reception of the cylindrical cross-heads 43 of clamping bolts 44 formed with threaded end sections for the reception of clamping nuts 45. The T shaped housing base section 41 is designed to coact with a coupler housing top section 46 which is also of T shaped construction and has integrally formed thereon a top plate 47 shaped to provide a plurality of pairs of spaced ears or lugs 48 to provide bolt receiving recesses 49 for receiving the bolts 44 in position to permit the nut 45 to be tightened to clamp the housing sections around a flexible T gasket for rigidly securing the pipes 38, 39 and 40 securely locked in coupled position and permitting a slight movement of said pipes with respect to the coupling housing and with respect to one another through the medium of the intermediate T shaped flexible sectional gasket.

The flexible sectional gasket of the T coupling consists of two identically constructed T shaped gasket sections 50 each of which is provided with a straight pressure flange 51 and two curved pressure flanges 52. The straight pressure flange 51 is connected to the curved pressure flanges 52 by semi-circular pipe engaging flanges 53. Another semi-circular pipe engaging flange 54 connects the end portions of the curved flanges 52 as illustrated in Figure 11. Each of the T shaped gasket sections 50 is also provided with a straight external pressure flange 55 and two curved or elbow shaped external pressure flanges 56. The external pressure flanges 55 and 56 of the two gasket sections seat against one another when the gasket is assembled and are engaged by shoulders formed on the upper and lower housing sections 46 and 41, respectively, so that the external flanges of the gasket sections are tightly pressed into sealing engagement with one another when the pivoted locking bolts are engaged in locking position as shown in Figure 10 to hold the coupling clamped around the converging ends of the pipes 38, 39 and 40.

As shown in Figure 11 each of the three pipe receiving ends of each of the gasket sections has embedded therein in spaced circular relationship a plurality of knurled gripping balls or wedge members 57 which project inwardly and outwardly through the end portions of the arms of a flexible gasket section into gripping engagement with the exterior surfaces of the pipes 38, 39 and 40 and into engagement with tapered surfaces 58 provided in the ends of the housing sections to receive the tapered ends of the arms of the gasket sections. It will thus be noted that the gripping balls 57 act to securely lock the pipes within the T housing and said balls act as wedging means between the pipes and the coupling housing whenever there is a tendency of the pipes to move outwardly from the housing and also when pressure from the liquid or other medium flowing through the coupling exerts pressure in the pockets formed behind the flanges 53 and 54 of the gaskets to exert sealing pressure outwardly in the gasket arms against the tapered surfaces 58 of the coupler housing.

While three preferred forms of the improved flexible pipe couplings have been illustrated and described, it is to be understood that the flexible sealing features and metal ball wedging and gripping devices may be combined with various other shapes of flexible pipe coupling such as a Y-shaped coupling, a four-way or cross coupling and other shaped couplings which may be used for the purpose of securely coupling and sealing pipes, metal hoses or the like in desired relationship.

The improved types of flexible pipe couplings herein described are of the quick detachable type and may be readily disconnected by merely loosening the bolt nuts, without completely removing the same from the bolts, and then swinging the bolts outwardly about their pivoted T heads into release positions thereby releasing the housing sections and the flexible gasket sections from engagement with the pipes.

From the foregoing description, it will be apparent that the present invention provides improved flexible pipe couplings including both a sectional metal housing and a sectional flexible gasket including means for quickly mounting the coupling on the adjacent or converging ends of pipes and also permitting a quick detachment of the coupling from said pipes. The coupling includes the improved sectional flexible gasket which not only is provided with interior pressure flanges adapted to engage around and along the adjacent ends of the pipes but also affords external sealing flanges to be clamped between the housing sections to insure a more efficient and positive seal around the coupled pipes. The sectional flexible gasket is so positioned that metalto-metal contact between the pipes and the metal sections forming the coupling housing is obviated. The flexible gasket is also improved by having embedded therein the knurled or roughened gripping balls or members which act as wedging means for locking the pipes within the coupling housing. This wedging action is accomplished when there is a tendency of the pipes to pull out as well as when the pressure exerted within the chambers of the flexible gasket by the liquids, gases or other mediums flowing through coupling and pipes, exerts sealing pressure behind the interior pressure flanges of the gasket sections to sealingly and tightly press the same into engagement with the pipes to provide a highly efficient seal within the coupling and around the coupled pipes.

It will, of course, be understood that various other details of construction may be varied through a wide range without departing from the principles of this invention and it is, therefore, not the purpose to limit the patent granted hereon otherwise than necessitated by the scope of the appended claims.

I claim as my invention:

1. A flexible pipe coupling comprising a sectional housing for engagement around the ends of pipes to be coupled, flexible gasket sections in said housing each spanning the space between the pipes, each of said gasket sections formed with continuous pressure flanges on the interior thereof for seating both circumferentially and longitudinally against the pipes and adapted to be forced into sealing contact with the pipes by the pressure exerted by the medium flowing through the coupled pipes, each of said gasket sections also formed with integral external sealing flanges adapted to be clamped between the sections of said housing.

2. A flexible pipe coupling comprising a sectional metal housing, means for clamping the same around the ends of pipes to be coupled, flexible gasket sections in said housing and separating the same from the pipes and spanning the space between the ends of the pipes, continuous pressure flanges formed in each of the gasket sections engaging around and longitudinally across the space between the pipes and adapted to be forced into sealing contact with the pipes by the pressure exerted by the medium flowing through the coupled pipes to increase the sealing effect of the gasket sections produced by the means for clamping the sectional housing and the gasket on the pipes.

3. A flexible pipe coupling comprising a sectional metal housing for engagement around the ends of pipes to be coupled, flexible chambered gasket sections in said housing and in contact with the pipes to connect the same, each of said gasket sections including integral flanges projecting between the housing sections, and curved pivot bolts connected to the housing for clamping the housing and said gasket sections in place to couple the pipes, said bolts having the pivoted ends mounted on one of the housing sections nearer the medial plane of the coupling than the nut carrying ends of the bolts to provide diagonal clamping forces between the housing sections.

4. A flexible pipe coupling comprising a sectional housing for receiving the ends of pipes therein, bolts pivotally mounted on one of the sections of the housing and interfitting with another section of the housing for clamping the housing in place, flexible chambered gasket sections in the housing and in contact with the pipes to connect the same, integrally connected transverse and longitudinally disposed pressure flanges of rectangular cross-section formed in each of the chambered gasket sections adapted to be forced into sealing contact with one another and with the pipes both by the clamping bolts and by the pressure exerted by the medium flowing through the coupled pipes and entering the chambered gasket sections behind the pressure flanges, and gripping means embedded in the gasket sections and projecting therefrom into gripping and wedging contact with the pipes and the coupling housing.

5. In a quick attachable and detachable coupling structure for holding pipes flexibly coupled one to another, contiguous flexible gasket sections receiving and connecting the adjacent ends of the pipes, a clamping housing enclosing the gasket sections and sealingly clamping the same around the pipes, and integrally connected flexible pressure flanges rectangular cross-section formed around the ends and lengthwise on the interior of each gasket section to form separated pressure chambers in the gasket sections around the pipes to receive the fluid flowing through the pipes and permit the fluid pressure to be exerted against the backs of said flanges to press the same into tight sealing contact with the pipes and also act to force the gasket sections into sealing contact with one another.

6. A flexible pipe coupling comprising a sectional clamping housing, and a pipe receiving gasket therein consisting of contacting sections each formed with connected circumferentially and longitudinally disposed angular pressure flanges forming a frame and a pressure chamber in each section, said sections having integral outwardly projecting flanges for clamping between the housing sections.

7. A flexible pipe coupling comprising a sectional clamping housing, pipe receiving gasket sections therein, connected pressure flanges formed in the interior of each of the gasket sections to provide a pressure chamber and a continuous groove therein, and sealing flanges radially formed on the exterior of the gasket sections to be clamped against the radial flanges of an adjacent section and between the sections of the housing.

8. In a pipe coupling of the class described including a flexible gasket unit comprising a plurality of flexible gasket sections having sealing flanges integrally formed on the exterior and on the interior thereof, with said interior flanges of angular cross-section and connected to one another to form continuously grooved pressure chambers in the gasket sections.

9. In a detachable coupling for a pipe conduit and the like, cooperable detachable sections for embracing the ends of the conduit to be joined, each having a curved channel substantially coextensive with one half of the curved periphery of the conduit, one of said sections having spaced notches and the other of said sections having bolt receiving lugs opposite to said notches, and curved bolts, one for each side of the coupling, each bolt having an end curved inwardly toward the medial plane of the coupling and engaged in a notch for pivotal movement therein and having another end engaged in lugs at one side of the coupling and detachably clamped thereto, each bolt upon release from the cooperating lugs being pivotally movable outwardly relative to the notch engaged thereby.

10. A pipe coupling comprising flexible gasket sections for receiving the ends of pipes to be coupled, a sectional notched housing engaged around the gasket sections to hold the same in sealing contact with the pipes, and curved clamping bolts for clamping the housing in place, each of said bolts mounted to have a pivoted end located closer to the medial plane of the coupling than the free end.

11. A flexible pipe coupling comprising a sectional housing for engagement around the ends of pipes to be coupled, flexible abutting gasket sections in said housing each spanning the space between the pipes, each of said gasket sections comprising a semi-cylindrical wall, a semi-cylindrical frame inside said wall and spaced therefrom, end walls integrally connecting the ends of said frame with the ends of said wall, and flanges integrally formed on the longitudinal edges of the wall and extending inwardly to integrally connect up with the longitudinal members forming part of said frame, said flanges also extending outwardly of said semi-cylindrical wall to form sealing flanges adapted to be clamped between the sections of the coupling housing.

12. A flexible pipe coupling comprising a sectional housing for engagement around the ends of the pipes to be coupled, flexible abutting gasket sections in said housing each spanning the space between the pipes, each of said gasket sections comprising a semi-cylindrical wall, a semi-cylindrical frame inside said wall and spaced therefrom, end walls integrally connecting the ends of said frame with the ends of said wall, flanges integrally formed on the longitudinal edges of said wall and extending inwardly to integrally connect up with the longitudinal members forming part of said frame, said flanges also extending outwardly of said semi-cylindrical wall to form sealing flanges adapted to be clamped between the sections of the coupling housing, and curved clamping bolts having the curved ends pivoted on one of the housing sections closer to the medial plane of the coupling than the free ends of the bolts which engage the other of the housing sections.

13. A flexible pipe coupling comprising a sectional metal housing for engagement around the ends of the pipes to be coupled, and clamping bolts having curved ends pivotally connected to one of the housing sections at points closer to the medial plane of the coupling than the nut carrying free ends of the bolts which engage another of the housing sections thereby positioning the clamping line of force between the housing sections in diverging inclined planes to more tightly clamp the housing sections in place.

14. A flexible pipe coupling comprising a sectional metal housing for engagement around the ends of the pipes to be coupled, clamping bolts having curved ends pivotally connected to one of the housing sections at points closer to the medial plane of the coupling than the nut carrying free ends of the bolts which engage another of the housing sections thereby positioning the clamping lines of force between the housing sections in diverging inclined planes to more tightly clamp the housing sections in place, and a plurality of abutting flexible gasket sections in said housing and in contact with the pipes, said gasket sections each formed with integral longitudinally disposed flanges projecting radially both inwardly and outwardly of the gasket sections, said flanges of one gasket section seating against those of another gasket section to position the outwardly projecting portions of the flanges between the housing sections of the coupling.

15. A flexible pipe coupling comprising a sectional metal housing for engagement around the ends of the pipes to be coupled, clamping bolts having curved ends pivotally connected to one of the housing sections at points closer to the medial plane of the coupling than the nut carrying free ends of the bolts which engage another of the housing sections thereby positioning the clamping lines of force in diverging inclined planes to more tightly clamp the housing sections in place, and a plurality of abutting flexible gasket sections in said housing and in contact with the pipes, said gasket sections each comprising a semi-cylindrical wall, a semi-cylindrical frame spaced from the inner surface thereof, walls integrally connecting the frame with the gasket wall and providing a continuous groove in the gasket section, two of said walls continuing radially outwardly beyond the exterior of the gasket section wall to form flanges projecting between the housing sections of the coupling.

16. In a flexible pipe coupling of the class described a plurality of contacting flexible gasket sections each comprising a curved housing wall, a curved frame spaced from the inner face thereof, integrally connected end and longitudinal walls connecting the frame with the housing wall to form a continuous channel within the gasket section, said longitudinal walls extending outwardly beyond the exterior of the housing wall to provide clamping flanges.

GEORGE J. ANDREWS.

REFERENCES CITED

The following references are of record in the file of this patent:

UNITED STATES PATENTS

| Number | Name | Date |
|---|---|---|
| 1,068,337 | Hahn | July 22, 1913 |
| 1,231,450 | Sutton | June 26, 1917 |
| 2,009,046 | Fons | July 23, 1935 |
| 2,041,132 | Johnson | May 19, 1936 |
| 2,165,920 | Burnip | July 11, 1939 |
| 2,226,304 | Dillon | Dec. 24, 1940 |